United States Patent Office 3,541,125
Patented Nov. 17, 1970

3,541,125
PREPARATION OF AMINE COMPLEXES OF ALUMINUM HYDRIDE
Leslie L. Sims, Baton Rouge, La., assignor to Ethyl Corporation, New York, N.Y., a corporation of Virginia
No Drawing. Filed May 17, 1968, Ser. No. 729,912
Int. Cl. C07f 5/06
U.S. Cl. 260—448                                    10 Claims

ABSTRACT OF THE DISCLOSURE

A process for the synthesis of amine complexes of aluminum hydride by the reaction of a tertiary amine hydrohalide or a tertiary amine and an aluminum halide with an alkali metal aluminum hydride in the presence of a hydrocarbon solvent.

BACKGROUND OF THE INVENTION

Amine complexes of aluminum hydride are known, their composition, properties and preparation being disclosed in the literature. Wiberg, Graf, and Uson, in their publication entitled "About Monomeric Aluminum Hydride, $AlH_3$," Z. Anorg. Allgem. Chem. 272: 221 and 226 (1953) disclose a method of preparation whereby aluminum chloride is reacted with lithium aluminum hydride to produce aluminum hydride which in turn is reacted with trimethylamine in the presence of an ether solvent to produce trimethylamine complex of aluminum hydride.

The above process lacks the advantage of utilizing a hydrocarbon solvent. Hydrocarbon solvents are less expensive, more stable, and more easily handled in a chemical process than ether solvents. Also, use of a hydrocarbon diluent wherein the alkali metal halide co-product (e.g., NaCl or LiCl) is insoluble provides for its automatic separation from the reaction end-product. Furthermore, the aluminum hydride solution in ether prepared in the first step of the Wiberg et al. method from lithium aluminum hydride in diethyl ether tends to be unstable and, if not used immediately, forms a precipitate of polymeric, intractable aluminum hydride etherate.

SUMMARY OF THE INVENTION

The present invention provides a method for forming an amine complex of aluminum hydride comprising, in combination, the steps of reacting a tertiary amine hydrohalide or a tertiary amine and an aluminum halide with an alkali metal aluminum hydride in the presence of a hydrocarbon solvent, and recovering the complex formed in the reaction mixture.

DESCRIPTION OF THE PREFERRED EMBODIMENTS

The present invention provides a novel but simple method for preparing amine complexes of aluminum hydride by reacting a tertiary amine hydrohalide or a tertiary amine and an aluminum halide with an alkali metal aluminum hydride in the presence of a hydrocarbon solvent. All the reactants and solvent are readily available and can be obtained at minimal expense.

Alkali metal aluminum hydrides that can be employed in the present process include lithium aluminum hydride, sodium aluminum hydride, potassium aluminum hydride, rubidium aluminum hydride, and the like. Of the alkali metal aluminum hydrides, sodium aluminum hydride is the most preferred since it is readily available at reasonable cost.

Aluminum trihalides suitable for use in the instant process are, for example, aluminum trichloride, aluminum tribromide, and aluminum triiodide, all in their anhydrous forms. Aluminum trichloride is especially preferred since it is a staple article of commerce and hence offers a cost advantage.

It has been found that the amine reactant of the present invention must be of a tertiary configuration. Thus, suitable amines (it is to be understood that the following amines may be amine hydrohalides) which may be utilized in the invention are tertiary aryl, cyclic, alkyl, alkenyl and aralkyl amines, including monoamines, diamines, triamines, etc. Typically, the amines of the present invention may be triphenyl amine; tetramethylethylene diamine, diphenylmethylamine; triethylene diamine, phenylmethylethylamine; tricyclohexylamine; hexamethylene tetraamine; phenylcyclohexyloctylamine; or mixtures thereof, and other similar compounds. A more preferred class of amines for use in the invention are aliphatic tertiary amines, which include trialkylamine and trialkenylamine. Further, these amines may generally contain up to about 40 carbon atoms each, and preferably contain alkyl and alkenyl groups each having from 1 to about 10 carbon atoms. Thus, useful amines of this class are tri-n-butylamine; tri-sec-butylamine; dibutylpentylamine; tri-tert-butylamine; n-butyloctyl-sec-butylamine; tripentylamine; trihexylamine; trihexenylamine; trioctadecylamine; didecenylpentylamine; tridecenylamine; and the like, as well as mixtures thereof. A most preferred class of amines for use in the invention are those in the lower alkyl amines such as triethylamine, triisopropylamine, and particularly, trimethylamine. By the term "lower" is meant that the alkyl groups each contain 6 carbon atoms or less. The above compounds may be readily prepared by procedures well known to those skilled in the art. The products of the present invention are these amines complexed with aluminum hydride.

The hydrocarbon diluent employed pursuant to the practice of this invention is one that is liquid under the process conditions as well as being inert to the reactants and the end-product tertiary amine complex of aluminum hydride. Preferred hydrocarbon diluents are the paraffins, cycloparaffins, and aromatics, especially mononuclear aromatics. Exemplary of suitable diluents are: pentane, hexane, 2,2-dimethylbutane, decane, cyclopentane, cyclohexane, benzene, toluene, o-xylene, and the like. The hydrocarbon diluent is preferably one wherein the end-product tertiary amine complex of aluminum hydride is readily soluble therein and wherein the by-product is not since this provides an efficacious manner by which they can be separated. For this reason, the alkanes and especially the aromatics, notably mononuclear aromatics are preferred since the solubility of the end-product amine complex of aluminum hydride is in general very good in these diluents. When operating under preferred operating conditions as hereinafter defined, the diluent is preferably one having a boiling point of at least about 70° C.

In order that those skilled in the art can thus appreciate the process of this invention, the following examples are given by way of description and not by way of limitation. In all runs the reactants were protected from the atmosphere by a nitrogen blanket. Transfer, weighing, etc. of materials were carried out in a nitrogen dry box. Hydrocarbon diluents were dried over sodium ribbon prior to use.

EXAMPLE I

Trimethylamine aluminum hydride

A two liter creased three-neck flask was fitted with a high speed stirrer, a carbon dioxide ("Dry Ice") cooled condenser, and a 10 millimeter I.D. glass tube. One liter of benzene, 57.6 grams (0.43 mole) of aluminum chloride, and 58.9 grams (1.55 moles, 20 percent excess) of powdered lithium aluminum hydride were charged into the flask. The mixture was vigorously stirred, and trimethylamine from a 100 gram flask was allowed to evaporate into the mixture through the glass tube which extended below the liquid surface. The flask containing the trimethylamine was kept thoroughly insulated by fiber glass and by this means the rate of addition was reduced.

When amine addition was complete (about 6 hours) the reaction mixture was filtered through a sintered glass filter to separate the solids from the benzene solution. The benzene was removed by evaporation under reduced pressure, without heating using a "Rinco" evaporator. In a representative run the residual solids weighed 115 grams after solvent removal. According to analysis the product was 94 percent pure, with 6 percent benzene; the yield was 70 percent.

EXAMPLE II

Trimethylamine aluminum hydride

Procedure similar to Example I is effected using toluene as a solvent and trimethylamine hydrochloride instead of trimethylamine and aluminum chloride and similar results are achieved.

EXAMPLE III

Trimethylamine aluminum hydride

This preparation was carried out using the procedure of Example I, except that 89 grams (1.55 moles) of 95 percent sodium aluminum hydride was used instead of lithium aluminum hydride. The product weighed 136 grams. On analysis the product was found to be 86 percent pure, the balance being benzene; the yield was 76 percent.

EXAMPLE IV

Trimethylamine aluminum hydride

The procedure of Example III is repeated using o-xylene as a solvent and aluminum bromide instead of aluminum chloride and similar results are achieved.

EXAMPLE V

Bis(trimethylamine) aluminum hydride

This material was prepared by the procedure described for Example I except the quantities of these reagents were cut in half while the amount of trimethylamine was unchanged. The product weighed 111 grams. The analytical data indicated a minimum purity of 70 percent; minimum yield was 62 percent.

EXAMPLE VI

Bis(trimethylamine) aluminum hydride

The procedure of Example V is repeated using toluene as a solvent and potassium aluminum hydride instead of lithium aluminum hydride and similar results are achieved.

EXAMPLE VII

Triethylamine aluminum hydride

Triethylamine (175 grams, 1.73 moles) and 150 milliliters of benzene were added dropwise to a stirred mixture of 28.9 grams (0.22 mole) aluminum chloride and 31.5 grams (0.83 mole) of powdered lithium aluminum hydride in 500 milliliters benzene. The mixture was centrifuged and the supernatant liquid decanted. Benzene was removed under reduced pressure, without heating, in a "Rinco" evaporator. The product, which was a liquid, was concluded to be triethylamine aluminum hydride.

EXAMPLE VIII

Triethylamine aluminum hydride

The procedure of Example VII is repeated using cyclohexane as a solvent and rubidium aluminum hydride instead of lithium aluminum hydride and similar results are achieved.

EXAMPLE IX

Bis(tri-n-butylamine) aluminum hydride

This preparation was carried out in a procedure similar to that for the triethylamine complex. Enough tri-n-butylamine was used to form the "bis" complex. The product was a liquid weighing 68 grams; the yield was 85 percent. The product was hypothesized to be a mixture of bis(tri-n-butylamine) aluminum hydride and free amine.

EXAMPLE X

Bis(tri-n-butylamine) aluminum hydride

The procedure of Example IX is repeated using 2,2-dimethylbutane as a solvent and aluminum iodide instead of aluminum chloride; similar results are achieved.

EXAMPLE XI

Bis(dimethylaniline) aluminum hydride 500 milliliters of benzene, 28.9 grams of aluminum chloride and 50 grams (0.83 mole) of sodium aluminum hydride were placed in a one liter, three-neck creased flask. Dimethylaniline (211 grams, 1.73 moles) in 100 milliliters of benzene was added dropwise while the reactants were vigorously stirred. Addition was over a period of 5 to 6 hours. The reaction mixture was stirred for 12 hours. The product was filtered and benzene was removed from the filtrate at reduced pressure without heating.

EXAMPLE XII

Bis(dimethylamine) aluminum hydride

The procedure of Example XI is repeated using decane as a solvent and similar results are achieved.

EXAMPLE XIII

Triethylenediamine aluminum hydride

Triethylenediamine (0.188 mole) in 200 milliliters of benzene was added over a 5 hour period to a vigorously stirred mixture of 500 milliliters of benzene, 11.4 grams (0.3 mole) lithium aluminum hydride, and 12.5 grams (0.094 mole) aluminum chloride. The reaction mixture was occasionally cooled with carbon dioxide ("Dry Ice") during the addition to keep the temperature below about 35° C. The reaction product was precipitated and was collected along with the other insolubles by filtration. The product was freed from lithium aluminum hydride, aluminum chloride and lithium chloride by continuous extraction with diethyl ether. Infrared indicated the product to be fairly pure. The product was insoluble in all common solvents.

EXAMPLE XIV

Triethylenediamine aluminum hydride

The procedure of Example XIII is repeated using cyclohexane as a solvent and similar results are achieved.

Several factors were found to influence the reactions of the above examples, the most important of which being the rate of addition of amine. A slow addition rate increased the yield of product and maintained the reaction temperature in the desired range (10 to 70° C). With the monoamines, reduced pressure distillation of solvent in the final isolation steps tended to cause loss of product if distillation was carried too far. The best yields of amine complex were obtained when distillation was stopped when the product still contained about 15 percent solvent. Further purification could be effeted by sublimation; however, where the product is intended for aluminum plating where solvent does not interfere, further purification may be unnecessary.

The maximum temperature at which the present process is conducted is mainly governed by the decomposition temperature of the end product tertiary amine complex of aluminum hydride. Generally, temperatures anywhere from about 0° C. to 100° C. are suitable. When utilizing the preferred reactants discussed above, it is preferred to operate at temperatures of from about 10° C. to about 70°C.

The present process being exothermic, the most attractive manner in which to conduct this process with a tertiary amine hydrohalide reactant is to charge the reactants into the hydrocarbon diluent which is initially at room temperature (25–30 C.). The heat evolved will raise the temperature of the reaction system and the reaction can be allowed to proceed on its own accord inasmuch as sufficient diluent may be used as a heat sink to keep the temperature within the ranges described above. However, cooling means may be employed if desired. Upon substantial completion of the reaction as evidenced by cessation of heat evolution, heat can be applied to the reaction mass to ensure full utilization of the raw materials. However, the reaction mass should not be heated to the decomposition temperature of the desired product.

When the aluminum halide-tertiary amine reactant combination is employed, the preferred manner in which to conduct the process is to add the aluminum halide to the sodium aluminum hydride in the solvent and then add the tertiary amine to the resultant slurry. The rate of reaction and temperature are controlled by the rate of addition of amine. Little or no reaction occurs until the amine is added. Upon completion of addition of the amine, heat can be applied to the reaction mass to ensure full utilization of the raw materials. Of course, the reaction mass should not be heated to the decomposition temperature of the desired product.

The pressure at which the instant process is conducted is not a limiting factor; generally, pressures anywhere from about atmospheric and above are suitable. An economical feature of this process is that it can be conducted at low pressures, for example on the magnitude of from about atmospheric to 50 p.s.i.g. since such pressures are easiest to achieve and are most economical. The operating pressure to be employed is largely dictated by the boiling point of the particular hydrocarbon diluent utilized which must be maintained essentially in its liquid state during the reaction in order to serve its intended purpose.

At any pressure the process is conducted under an inert atmosphere to avoid oxidation of the reactants and the end product tertiary amine complex of aluminum hydride. Suitable inert gaseous media for this purpose are nitrogen, hydrogen, gaseous aliphatic hydrocarbons, neon, argon, krypton, and the like. In some instances (e.g., where the volatilities of each of the members of the reaction system are sufficiently low) the process may be conducted under vacuum conditions.

The present process is conducted under anhydrous conditions to avoid excessive hydrolysis of the alkali metal hydride reactant. However, slight traces of moisture can be tolerated such as that normally present in commercially pure materials. For this reason, it is preferred to employ a slight excess of the alkali metal hydride reactant since it will eliminate any small amount of moisture being introduced into the system and also ensure complete reaction of the other reactants. About 3.1 to about 5 moles of the alkali metal hydride per mole of the aluminum trihalide can be employed with good results.

The composition of the end product is mainly a function of the amount of amine present. Thus, where it is preferred to produce predominantly a mono-tertiary amine complex of aluminum hydride, the molar ratio of the tertiary amine to that of the aluminum trihalide is preferably maintained at about 1:1. By the same token, where bis-tertiary amine complex of aluminum hydride is desired the molar ratio of the tertiary amine to trihalide is preferably about 2:1 or higher.

As can be seen from the above working examples, the reaction proceeds very rapidly. The process of this invention can be conducted on a continuous, semi-continuous or batch basis. Generally, residence times of from about a few minutes to about 1 hour are suitable for the realization of high yields.

Compounds produced by the present invention are excellent aluminum plating agents, and exceptionally pure aluminum coatings are easily realized, for example see U.S. Pat. 3,375,129. Also, the compounds prepared by way of the novel process of this invention are useful as reducing agents for the preparation of other metal hydrides, as well as mixed metal hydrides.

It is to be understood that the present invention is not limited by the specific embodiments described hereinabove, but includes such changes and modifications as may be apparent to one skilled in the art upon reading the appended claims.

I claim:

1. A method for forming an amine complex of aluminum hydride comprising, in combination, the steps of:
   (a) reacting a tertiary amine hydrohalide or a tertiary amine and an aluminum halide with an alkali metal aluminum hydride in the presence of a hydrocarbon solvent; and
   (b) recovering the complex formed in the reaction mixture, said steps being carried out under an atmosphere inert with respect to reactants and products.

2. The method of claim 1 wherein said alkali metal aluminum hydride is sodium aluminum hydride.

3. The method of claim 1 wherein said alkali metal aluminum hydride is lithium aluminum hydride.

4. The method of claim 1 wherein said tertiary amine is trimethylamine, said aluminum halide is aluminum chloride and said alkali metal aluminum hydride is sodium aluminum hydride.

5. The method of claim 1 wherein said tertiary amine is trimethylamine, said aluminum halide is aluminum chloride and said alkali metal aluminum hydride is lithium aluminum hydride.

6. The method of claim 1 wherein said tertiary amine is triethylamine, said aluminum halide is aluminum chloride and said alkali metal aluminum hydride is sodium aluminum hydride.

7. The method of claim 1 wherein said tertiary amine is triethylamine, said aluminum halide is aluminum chloride and said alkali metal aluminum hydride is lithium aluminum hydride.

8. The method of claim 1 wherein said solvent is selected from the group consisting of toluene and benzene.

9. The method of claim 1 wherein the ratio of tertiary amine to aluminum halide is 1:1.

10. The method of claim 1 wherein the ratio of teritary amine to aluminum halide is 2:1.

References Cited

UNITED STATES PATENTS 3,326,955 6/1967 Brendel et al. _____ 260—448
3,394,158 7/1968 Chini et al.

OTHER REFERENCES

Ruff et al.: J.A.C.S., vol. 82, 1960, pp. 2141–44.
Ehrlich et al.: Inorganic Chemistry, vol. 3, No. 5, 1964, pp. 628–31.

TOBIAS E. LEVOW, Primary Examiner

H. M. S. SNEED, Assistant Examiner

Notice of Adverse Decision in Interference

In Interference No. 98,294, involving Patent No. 3,541,125, L. L. Sims, PREPARATION OF AMINE COMPLEXES OF ALUMINUM HYDRIDE, final judgment adverse to the patentee was rendered July 1, 1974, as to claims 1, 5, 7 and 8.

[*Official Gazette October 1, 1974.*]